Feb. 2, 1932. L. B. NEIGHBOUR 1,843,431
MANURE SPREADER
Filed May 28, 1927 4 Sheets-Sheet 1

Witness
Wilton Lenoir

Inventor
Leonard B. Neighbour,
John L. Jawson.
Attorney.

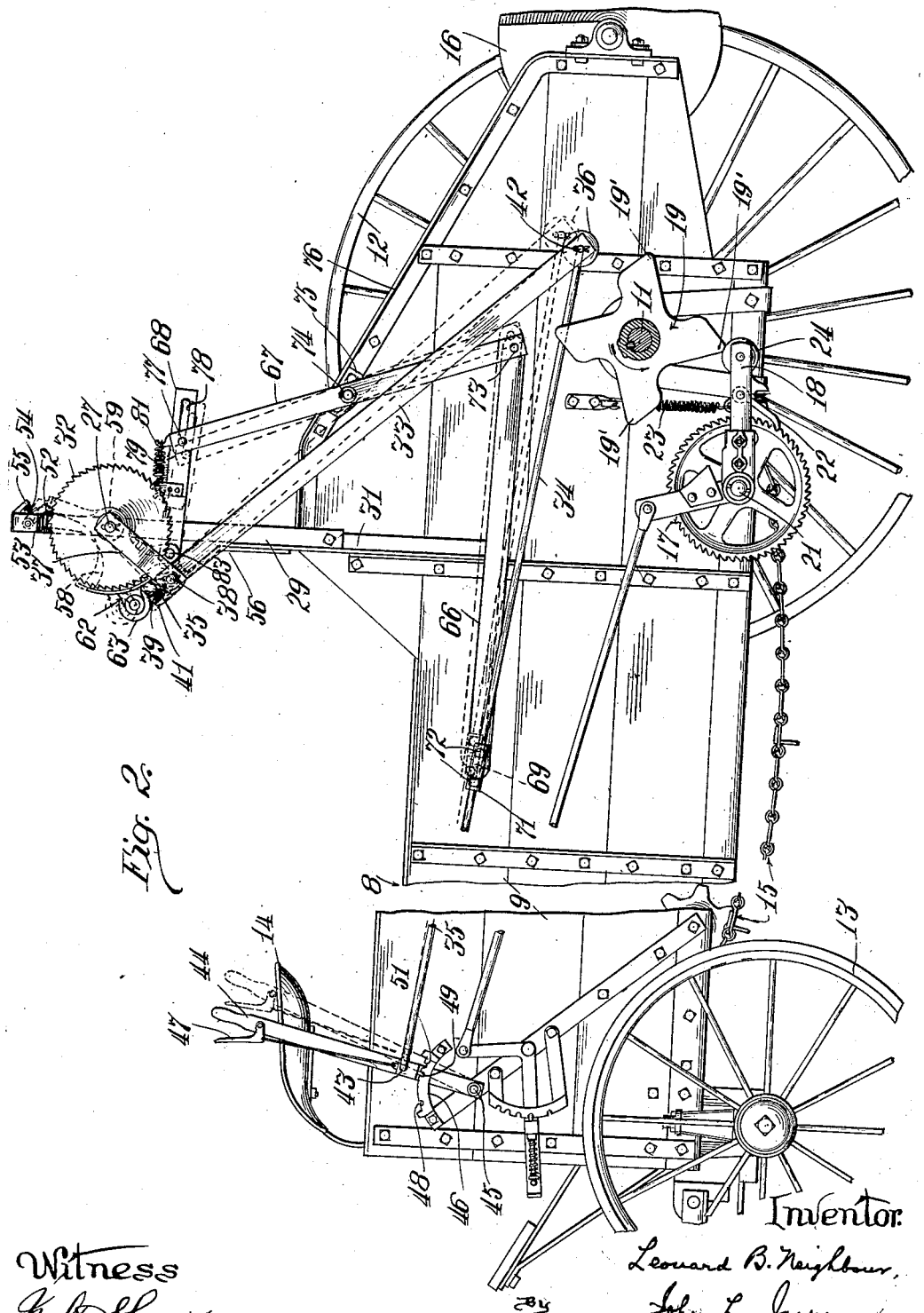

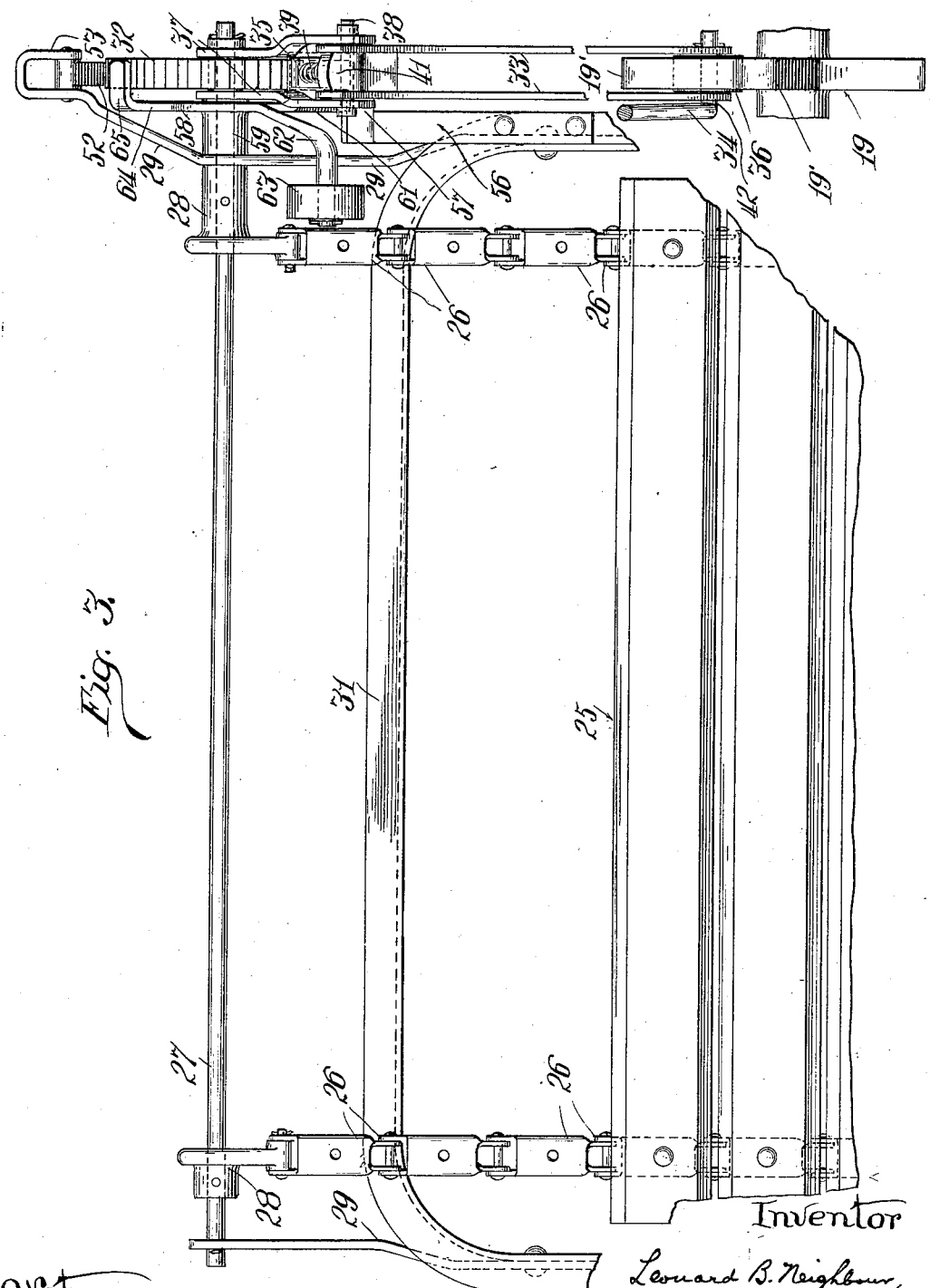

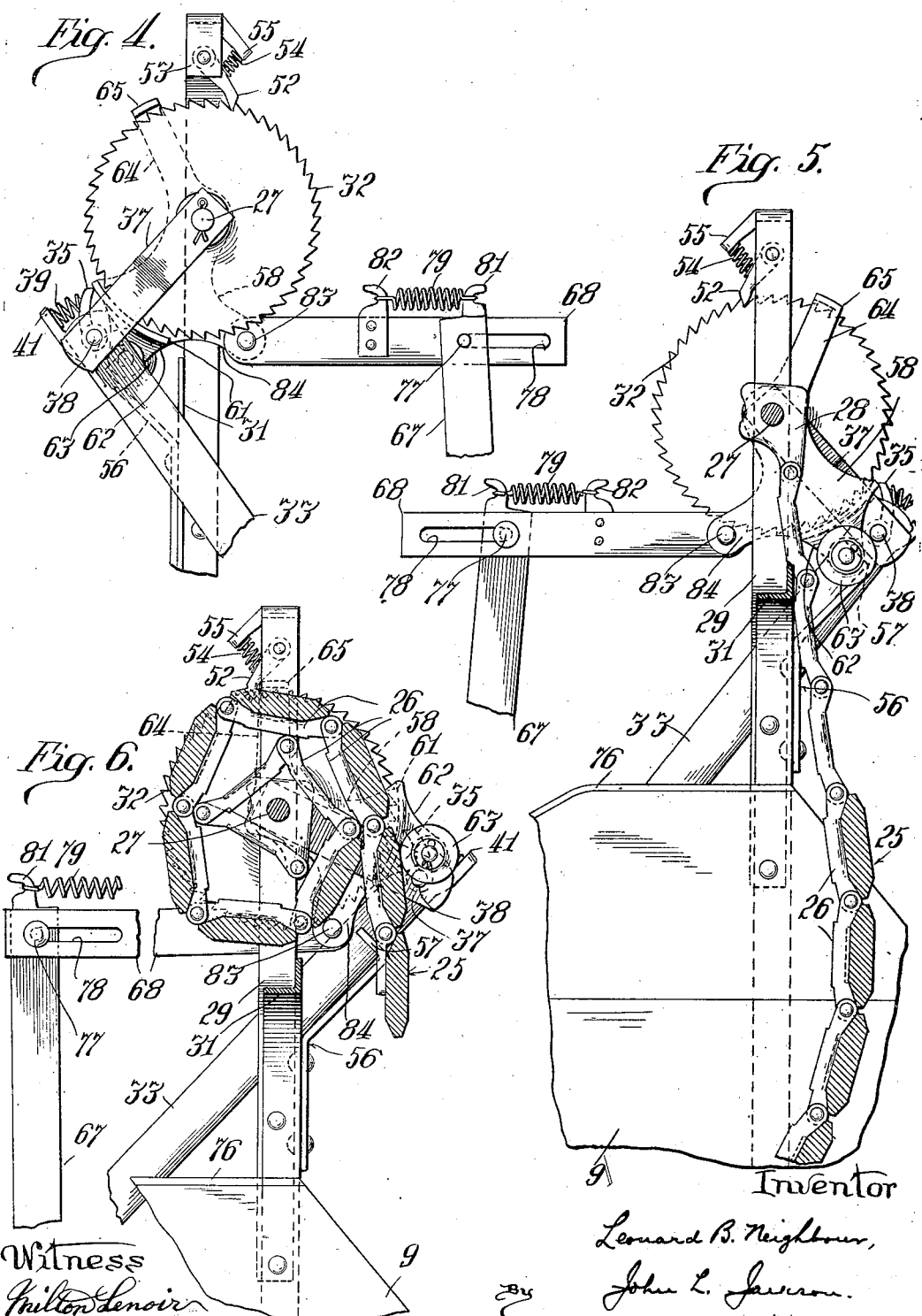

Patented Feb. 2, 1932

1,843,431

UNITED STATES PATENT OFFICE

LEONARD B. NEIGHBOUR, OF MOLINE, ILLINOIS, ASSIGNOR TO DEERE & COMPANY, OF MOLINE, ILLINOIS, A CORPORATION OF ILLINOIS

MANURE SPREADER

Application filed May 28, 1927. Serial No. 194,881.

The present invention relates to manure spreaders and has particular reference to improved means for operating the end gate which is quite commonly provided in this type of machine.

The invention has as its general object to provide a manure spreader wherein such end gate is power operated. In a more specific aspect the invention aims to provide traction driven means, utilizing the traction power of the machine, for operating the end gate; also to adapt this traction driven means to the operation of an end gate of the flexible curtain type, such as I have described in my copending application, Serial No. 110,908, filed May 22, 1926, and which has matured into Patent No. 1,765,993.

Other objects of the invention are to provide gate operating means of the above description which will be controllable from the driver's seat; to provide means which will automatically render ineffective said gate operating means when the gate has been raised to its completely open position; and to provide means, also operable from the driver's seat, for releasing the gate to permit it to move to closed position.

Referring to the accompanying drawings illustrating a preferred embodiment of my invention:

Fig. 2 is a similar view, showing in full lines the position of the control lever, and the traction driven mechanism corresponding to the idle condition of the latter, and showing in dotted lines the relative positions of these same parts corresponding to the operation of tripping the curtain, for dropping the same to its closed position.

Fig. 3 is a fragmentary transverse view on a larger scale, showing the upper portion of the curtain and its operating mechanism.

Fig. 4 is a fragmentary detail view of the pawl and ratchet mechanism for winding the curtain.

Fig. 5 is a similar view from the opposite side showing the relation of the parts when the curtain is lowered, and Fig. 6 shows the position of these same parts when the curtain has been wound to its completely open position.

Figure 1:
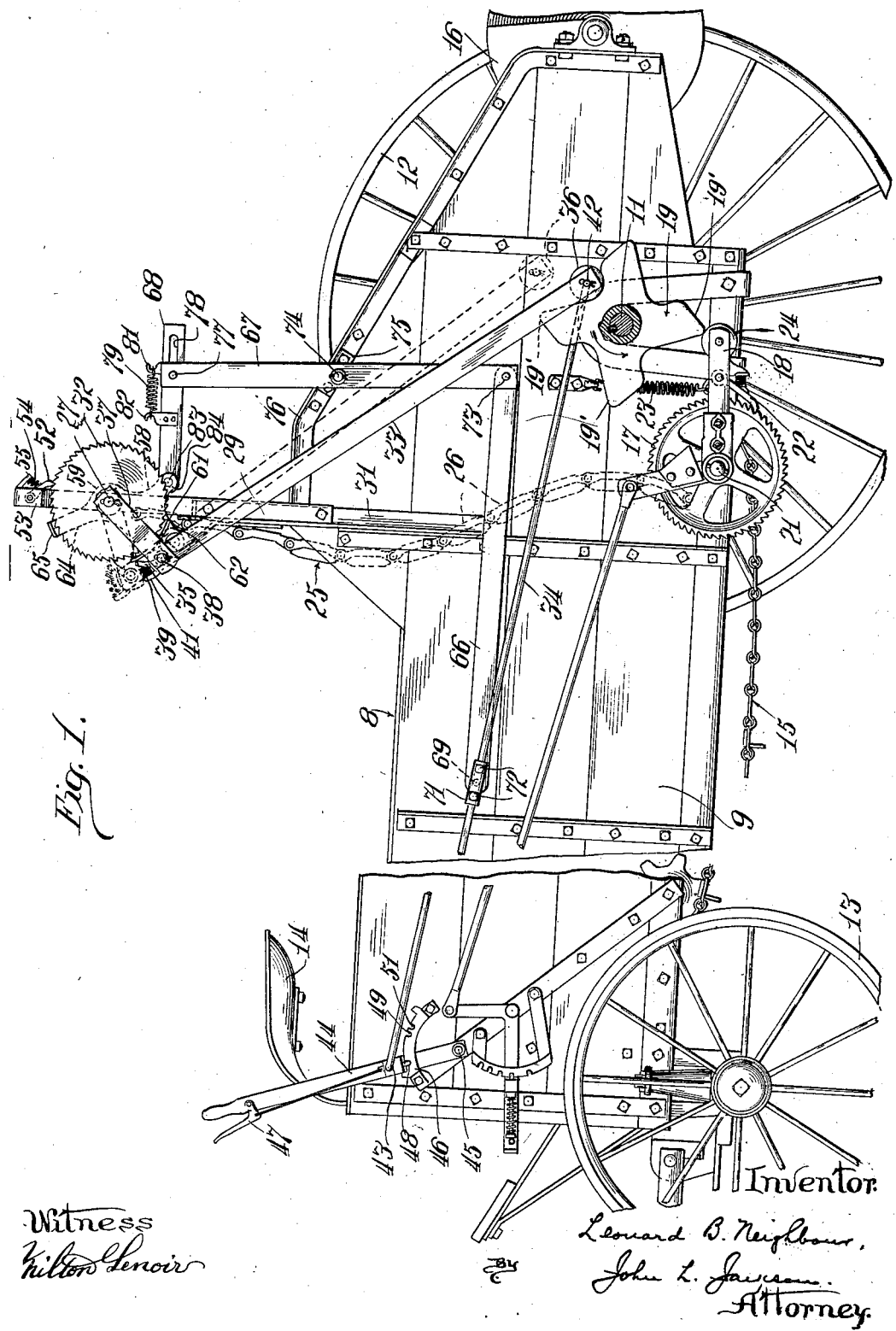
Figure 1 is a side view of the present manure spreader with the traction wheel on the near side of the machine broken away, this view showing the control lever and the traction driven means in position to wind the curtain to raised position.

The machine comprises the usual bed 8 consisting of the side walls 9 and a bottom wall (not shown) which form a boxlike compartment for holding the manure. The rear end of the bed is supported on a rear axle 11 on which are journaled rear wheels 12, and the front end of the bed is supported on front wheels 13, the axle of which has a swiveled or fifth wheel connection with the bed. The operator's seat 14 is mounted adjacent to the front end of the bed. In accordance with standard practice, the manure is arranged to be fed toward the rear end of the bed by a slowly moving apron 15, which is usually made up of cross slats linked together and adapted to travel around sprocket wheels at the front and rear portions of the bed whereby the upper flight or course of this apron will feed the manure rearwardly along the bottom of the bed. Adjacent to the rear end of the bed the manure is shredded or broken up by one or more rotating beater cylinders, which disintegrate the mass of manure and throw it rearwardly upon a rotating distributor 16. These beater cylinders and rotating distributor are devices well known in the art of manure spreaders and therefore there is no necessity for showing them in detail.

The apron 15 is shown as being actuated by traction driven means comprising a ratchet wheel 17, an oscillating pawl arm 18 and a cam wheel 19. The ratchet wheel 17 is keyed to a transversely extending shaft 21 on which are mounted sprocket wheels over which travels the apron 15. The arm 18 is pivotally supported on the shaft 21 and carries a pawl 22 for engaging in the teeth of the ratchet wheel for advancing the latter. Suitable spring means 23 serves to hold the pawl in the teeth of the wheel and to retract the arm 18 after each advancing movement. The cam wheel 19 comprises a plurality of cam projections 19' which successively engage a roller 24 pivotally mounted on the end of the arm 18, for imparting an oscillatory swinging movement thereto. The cam wheel 19 is keyed to the rear axle 11, and the latter is driven by the rear wheels 12 through suitable ratchet mechanisms which function to rotate the axle when the machine is moving forwardly, but which release the axle from the wheels when the machine is moving backwardly. The foregoing construction of traction driven means for operating the feeding apron constitutes one of the features of my copending application, Serial No. 140,711, filed October 11, 1926. Such apron feeding mechanism in and of itself constitutes no part of the present invention, but I have described the same for the reason that in the present invention the power for operating the curtain is derived from this same cam wheel 19. In this copending application I have disclosed the ratchet mechanisms which are operatively interposed between the rear wheels 12 and the axle 11, and have also illustrated the driving mechanism for the beater cylinders and the distributor 16.

Referring now to the end gate and its operating mechanism, it will be observed from Figs. 1 and 3 that such end gate, which is designated 25, consists of a series of cross slats pivotally connected together at their ends by two series of links 26—26. These cross slats and connecting links form in effect a flexible curtain or apron which is adapted to be raised and lowered between the side boards of the bed directly in front of the beater cylinders, the curtain being illustrated in its lowered position in dotted lines in Figure 1. As described in my copending application, Serial No. 110,908, the curtain, by virtue of its flexibility can swing rearwardly under the auxiliary beater and towards the main beater so that although the curtain keeps the load from working back into engagement with the beaters or from spilling from the end of the machine while in transport, it does not reduce the capacity of the bed. The mechanism for winding the curtain to its raised position comprises a transversely extending shaft 27, and coupling members 28, fixedly secured thereto, adjacent to the ends of the shaft. The upper ends of the pivoted series of links 26—26 are pivotally connected to these coupling members 28, the latter serving as spiders or hubs on which the links of the curtain wind in the operation of rolling up the curtain. The ends of the shaft 27 are journaled in upright standards 29 which are secured to the sides of a U-shaped frame 31, the downturned ends of which are fastened to the side boards of the bed.

The traction driven mechanism for operating the curtain winding mechanism comprises a ratchet wheel 32 and a pair of cooperating links 33 and 34, one of which carries a pawl 35 for engaging in the teeth of the ratchet wheel 32. This operating mechanism is disposed on the same side of the bed as the cam wheel 19, so as to include the latter as one of its operating elements, a roller 36 being pivoted at the connecting ends of the two links for engaging with the cam wheel. Referring to Fig. 3, it will be observed that the link 33 consists of two spaced bars which are pivotally connected at their upper ends to a swinging arm 37, also consisting of two spaced bars. The arms or bars 37 are pivotally supported on the winding shaft 27 on opposite sides of the ratchet wheel 32, and their outer swinging ends engage over the outer sides of the link bars 33, to which they are pivotally connected by a pivot pin 38. The pawl 35 is mounted on this pivot pin 38 and is urged into the teeth of the ratchet wheel 32 by a spring 39 which is interposed between the back of the pawl and a lug 41 projecting upwardly from the ends of the link bars 33. The other link 34 consists of a rod, the rear end of which is bent to pass through the link bars 33 as indicated at 42, such laterally bent end pivotally connecting the two links 33 and 34 and forming a pivot for the roller 36. The front end of the rod 34 pivotally connects at 43 to a control lever 44 disposed alongside the driver's seat 14. Such lever is pivoted at 45 to swing over a suitable latching quadrant 46 with which cooperates any suitable grip released latch mechanism 47 on the lever. The lever is adapted to occupy any one of three positions determined by the notches 48, 49 and 51 in the quadrant, with which notches the latch mechanism 47 is adapted to engage. When the control lever is in its forward notch 48 the roller end of the operating link 33 is brought within the path of movement the cams 19', corresponding to the full line position of the parts as shown in Figure 1. When the control lever is moved back to the second or intermediate notch 49 the roller end of the operating link is swung upwardly and rearwardly out of the path of movement of the cams, as indicated in full lines in Fig. 2. When the control lever is moved back to its rearmost notch suitable tripping mechanism is actuated which releases the curtain for permitting its descent to closed position, as I shall hereinafter describe.

Assuming that the curtain is in its closed position and that it is desired to raise the same, the control lever 44 is moved forwardly to its front notch 48, which swings the roller end of the operating link 33 into the path of movement of the traction driven cams 19', as above remarked. In the rotation of the cam element, with the forward travel of the machine, each cam will force the roller 36 out to the periphery of the cam in passing under the roller. Inasmuch as the link 34 functions as a radius rod for the roller 36, compelling the latter to swing in an arc around the center 43, the roller will be caused to move upwardly as each cam passes under it, thus imparting an upward component of motion to the operating link 33. Such upward movement of the link causes the upper end thereof to swing concentrically of the ratchet wheel, through the pivotal connection with the swinging arms 37, whereby a forward advancing movement is transmitted to the ratchet wheel through the pawl 35. As each cam 19' passes out from under the roller 36 the operating link oscillates downwardly under the action of gravity, thereby swinging the roller down into the path of the next succeeding cam. Thus successive advancing movements are imparted to the ratchet wheel 32 during the continued travel of the machine, causing the curtain to be wound upon the coupling members 28 on the shaft 27. As the ratchet wheel is given each step by step advancement it is held against retrograde movement by a dog 52 which engages in the upper part of the ratchet wheel. As best shown in Fig. 3, this dog is pivotally supported in the U-shaped upper end 53 of the adjacent supporting standard 29. A spring 54 is confined between the back of the dog and a lug 55 projecting down from the upper part of the standard (Fig. 4). The downward movement of the operating link 33, between successive advancing movements given the ratchet wheel 32, is preferably limited by a stop 56 which is secured to the U-shaped frame member 31 (Fig. 3). This stop comprises a projecting shoulder 57 which is adapted to be engaged by one of the swinging arms 37 when the operating link has oscillated downwardly to the lower limit of its predetermined motion. After the curtain has been completely wound on the shaft 27 the operator moves the control lever 44 back to the second notch 49, which switches the roller end of the operating link 33 rearwardly out of the path of the cams, as indicated by the full line position of such operating link in Fig. 2. Hence, at this time the traction driven mechanism remains inert, with the curtain held in its raised position through the engagement of the dog 52 in the ratchet wheel 32.

To prevent continued winding rotation of the shaft 27, and consequent flopping of the end of the curtain, in the event that the operator should fail to move his control level 44 back to the idle notch 49 immediately upon the curtain being wound to its completely raised position, I have provided means which will automatically interrupt the rotation of the winding mechanism as soon as the curtain reaches its completely raised position. Referring to Figs. 4, 5 and 6, such interrupting means comprises a swinging plate 58 having a hub portion 59 which is journaled on the winding shaft 27 between the ratchet wheel 32 and the adjacent standard 29. Projecting outwardly from this plate is a short arcuate flange 61 which overlies a portion of the toothed periphery of the ratchet wheel in close proximity thereto. Extending inwardly in the opposite direction from the plate 58 is an arm 62 on the end of which is journaled a roller 63 which lies in the path of movement of the curtain 25, as best shown in Fig. 3. The plate normally hangs downwardly in the position indicated in full lines in Fig. 5, in which position the arcuate flange 61 is disposed at the lower limit of oscillation of the pawl 35 so as not to interfere with the engagement of the pawl in the ratchet teeth. As the curtain winds upwardly the edge thereof passes under the roller 63, the latter remaining in its lower position, however, during this initial part of the curtain winding operation. The parts are so proportioned that the curtain will wrap once around its winding means and will have one or two cross slats starting a second convolution when the curtain reaches its fully raised position. The radial distance of the roller 63 from the winding axis 27 is such that the first convolution will readily pass under the roller, but as soon as the second convolution begins to form, the increased diameter of the curtain roll will cause the end portion of the curtain to pick up the roller 63, carrying the latter upwardly towards the position shown in Fig. 6. This will result in the arcuate flange 61 moving up between the pawl 35 and ratchet wheel 32, thus acting as a spacing or blocking member for preventing the pawl from engaging in the teeth of the ratchet wheel. The movement of the plate 58 to the position corresponding to complete interruption of the winding operation will be completed in one or two strokes of the operating link 33, after which the pawl 35 will merely oscillate back and forth over the outer surface of the flange 61 during succeeding strokes of the operating link. Hence the winding operation will be completely interrupted after the curtain has been raised, and the curtain will be held in such position by the dog 52 engaging the ratchet wheel 32. It will therefore be seen that as the result of the foregoing construction there is no possibility of breakage of the operating parts after the curtain has been raised to its fully open position, nor is the end of the curtain permitted to flop around in this position, and the operator is not required to watch the raising operation. The control lever 44 can be moved back to its idle notch 49 any time after the curtain has been raised.

The mechanism for tripping the curtain for causing its descent to closed position also includes the plate 58 as one of its operating elements. Extending upwardly from the plate is an arm 64 having a laterally bent lug or finger 65 which extends over the periphery of the ratchet wheel in back of the dog 52. When the plate 58 has been swung to the position corresponding to the interruption of the winding operation (Fig. 6) the tripping lug 65 is disposed just in back of the dog in position to thrust the latter up out of the ratchet teeth upon a slight further movement being given the plate 58. Such further movement is effected by moving the control lever 44 back to its tripping notch 51, which operates through a link 66, lever 67 and link 68 to impart the desired additional tripping movement to the plate. Referring to Figure 1, the forward end of the first mentioned link 66 has pivotal connection at 69 to the radius rod 34, such pivotal connection preferably consisting of a pivot pin projecting laterally from a sleeve 71 which is adjustably secured to the radius rod by bolts or screws 72. The rear end of the link 66 is pivotally connected at 73 to the lower end of the lever 67. Such lever is pivotally supported intermediate its ends on a pivot stud 74 projecting from a bracket 75 secured to one of the frame bars 76 of the bed. The upper end of such lever carries a pin 77 which has lost motion connection with the link 68 through a slot 78 formed in the latter. A tension spring 79 is extended between a hook 81 on the end of the lever and a hook 82 riveted to the link 68, whereby this spring normally tends to revolve the plate 58 downwardly to the position illustrated in Figs. 4 and 5, using the lever 67 as a stationary point from which to exert its pulling action on the link 68. The latter is pivotally connected at 83 to an arm 84 extending from the plate 58.

Assuming now that the curtain has been raised to its completely open position with the plate 58 swung upwardly as shown in Fig. 6, and that the operator desires to lower the curtain, he moves the control lever back to the rear notch 51 which operates through the rod 34 to thrust the link 66 and the lower end of lever 67 backwardly, moving such link or lever to the positions indicated in dotted lines in Fig. 2. Prior to such movement the pin 77 was engaging against the forward end of the slot 78—assuming the control lever to have been in its idle position—and this movement thrusts the link 68 forwardly. Such movement in turn rocks the plate 58 through its final tripping throw, indicated in dotted lines in Fig. 2, causing the tripping lug 65 to push the dog 52 up out of the ratchet teeth. Immediately the curtain descends to closed position, this following from the weight of the end slats tending to cause the curtain to unwind.

The general operation of the curtain actuating mechanism will be apparent from the foregoing description. When the spreader is transporting its load to the field the curtain is down and the control lever 44 is in its idle position in engagement with the notch 49. At this time the feeding apron 15 and the beater cylinders are of course inert. As the machine approaches the point where the manure is to be spread the operator moves the control lever forwardly to the forward notch 48 which causes the traction driven means to start operation for raising the curtain, as before described. If the load has forced the curtain back against the beater cylinders, such will not interfere with the raising of the curtain as these cylinders are free to revolve at this time. It should be noted at this point that the pressure of the load against the curtain will not interfere with the raising thereof, owing to the great mechanical advantage of the operating mechanism, residing particularly in the slow moving, step by step action of the pawl and ratchet mechanism. With the curtain in raised position, the operator moves the control lever back to the idle notch 49 and thereupon sets the apron 15 and the beater cylinders into operation to spread the manure. After the bed has been emptied of its load the curtain is dropped, preparatory to receiving another load, by the movement of the control lever back to the tripping notch 51.

So far as I am aware, I am the first in the art to provide power operated means for operating the end gate of a manure spreader. I consider it within the purview of my invention to derive this power from a power take-off on a tractor pulling the spreader, particularly in such instances where this power take-off is employed for driving the beater cylinders, feeding apron, etc. The claims hereinafter made are therefore intended to be generic and to cover any form of power driven means for operating any type of end gate in manure spreaders. When traction power is employed, it will be understood that instead of the rear wheels 12 the manure spreader might be equipped with caterpillar tread devices, in which case the traction power for operating the end gate would be derived from one or both of such caterpillar treads.

What I claim as my invention and desire to secure by Letters Patent, is—

1. A manure spreader comprising a conveyor, an end gate movable into and out of operative position relatively to said conveyor, means utilizing the traction power of the spreader for moving said end gate to one position, and means for controlling the transmission of power to said end gate.

2. In a manure spreader, the combination of an end gate movable between upper and lower positions, traction driven means for moving said end gate substantially vertically to its upper position, and means for controlling the transmission of power to said end gate.

3. In a manure spreader, the combination of an end gate comprising a flexible curtain adapted to be wound and unwound between upper and lower positions, and traction driven means for winding said curtain to its upper position.

4. In a manure spreader, the combination with a bed adapted to contain the material to be distributed, and means for moving such material therein, of an end gate movable into position across the path of the material, and traction driven means for moving said end gate out of operative position.

5. In a manure spreader, the combination with a bed adapted to contain the material to be distributed, means for moving such material therein, and an operator's seat, of an end gate movable into position across the path of the material, traction driven means for moving said end gate to one position, and control means operable from the operator's seat for controlling said traction driven means.

6. In a manure spreader, the combination with a bed adapted to contain the material to be distributed, and a ground engaging traction element supporting one end of said bed, of an end gate movable into and out of position across the discharge end portion of the bed, and motion transmitting mechanism operatively connecting said traction driven element and said gate for moving the latter to raised position, said motion transmitting mechanism comprising pawl and ratchet means for transmitting a step by step movement to said gate.

7. In a manure spreader, the combination with a bed adapted to contain the material to be distributed, and a traction wheel supporting one end of said bed, of a flexible curtain mounted to move into and out of position across the discharge end portion of the bed, rotary winding means upon which said curtain is adapted to be wound, a rotary element driven by said traction wheel, and reciprocatory link means for transmitting motion from said rotary element to said rotary winding means.

8. In a manure spreader, the combination with a bed adapted to contain the material to be distributed, means for moving such material therein, a ground engaging traction member supporting one end of said bed, and an operator's seat adjacent to the other end of said bed, of a flexible curtain suspended to hang loosely between the sides of the bed across the path of the material, winding means upon which said curtain is adapted to be wound for raising it to open position, means for transmitting power from said traction element to said winding means, and control means operable from the driver's seat for controlling said power transmitting means.

9. A manure spreader comprising an end gate movable into and out of operative position, traction driven means for actuating said end gate, and means for automatically interrupting the operation of said traction driven means when said end gate is moved to one of its positions.

10. A manure spreader comprising an end gate, traction driven means for raising said gate to open position, and means for automatically interrupting the operation of said traction driven means when said end gate reaches its raised position.

11. In a manure spreader, the combination with a bed adapted to contain the material to be distributed, means for moving such material therein, and an operator's seat, of an end gate movable into position across the path of the material, traction driven means for raising said end gate to open position, control means operable from the driver's seat for initiating the operation of said traction driven means, and means for automatically interrupting the operation of said traction driven means when said end gate reaches its completely open position.

12. In a manure spreader, the combination with a bed adapted to contain the material to be destributed, means for moving such material therein, and an operator's seat, of an end gate mounted to move into and out of position across the discharge end portion of the bed, traction driven means for raising said end gate to open position, detent means for holding said gate in open position, and means operable from the operator's seat for releasing said detent means.

13. In a manure spreader, the combination with a bed adapted to contain the material to be distributed, means for moving such material therein, and an operator's seat, of a flexible curtain movable into position across the path of the material, winding means upon which said curtain is adapted to be wound for moving the the latter to raised position, traction driven means for actuating said winding means, said traction driven means comprising a ratchet wheel, a dog engaging in said ratchet wheel for holding said curtain in raised position, and means operable from the operator's seat for releasing said dog.

14. In a manure spreader, the combination with a bed adapted to contain the material to be distributed, means for moving such material therein, and an operator's seat, of an end gate mounted to move into and out of position across the discharge end portion of the bed, traction driven means for raising said gate to open position, detent means for holding said gate in open position, and a control lever actuatable from the operator's seat and operatively connected to initiate the operation of said traction driven means, and to release said detent means.

15. In a manure spreader, the combination with a bed adapted to contain the material to be distributed, and means for moving such material therein, of a flexible curtain movable into position across the path of the material, winding means upon which said curtain is adapted to be wound to raised position, a ratchet wheel connected with said winding means, an oscillating link, a pawl moving with said link and adapted to engage said ratchet wheel, and a rotating traction driven member for imparting oscillating movement to said link.

16. In a manure spreader, the combination with a bed adapted to contain the material to be distributed, means for moving such material therein, and a ground engaging traction element, of a flexible curtain movable into position across the path of the material, winding means upon which said curtain is adapted to be wound, a ratchet wheel connecting with said winding means, a rotating cam driven by said traction element, an operating link adapted to be reciprocated by said cam, a pawl carried by said link for engaging in the teeth of said ratchet wheel, and a radius link for controlling the position and movement of said operating link.

17. In a manure spreader, the combination with a bed adapted to contain the material to be distributed, means for moving such material therein, a traction wheel supporting one end of said bed, and a operator's seat at the other end of said bed, of a flexible curtain movable into position across the path of the material, winding means upon which said curtain is adapted to be wound, a ratchet wheel connected with said winding means, a rotating cam driven by said traction wheel, an operating link having a roller at its lower end for engaging with said cam, an arm pivoted concentrically of said ratchet wheel and supporting the upper end of said link, a pawl carried by said link for engaging with said ratchet wheel, a plate member pivotally supported concentrically of said ratchet wheel, said plate member comprising a blocking portion movable into position between said pawl and said ratchet wheel, means carried by said plate member, adapted to be engaged by the curtain, for moving said plate member to blocking position when said curtain has been raised to completely open position, a dog engaging said ratchet wheel for holding the curtain in raised position, a control lever adjacent to the operator's seat, a rod pivotally connected between said control lever and said operating link, whereby said control lever is operable to move the roller end of said link into and out of the path of movement of said cam, means carried by said plate member for tripping said dog, and operating connections between said plate member and said control lever whereby the latter is operable to effect said tripping movement of said plate member.

18. In a manure spreader, the combination with a bed adapted to contain the material to be distributed, an apron for moving such material therein, and a ground engaging traction element for supporting one end of said bed, of a rotating member driven by said traction element, means driven by said rotating member for transmitting advancing movement to said apron, an end gate for said bed, and means driven by said rotating member for moving said end gate to one of its positions.

19. In a vehicle, the combination of a load carrying compartment, a conveyor for moving the load in said compartment, a gate for closing a portion of said compartment, means deriving power from the travel of said vehicle for moving said gate to one position, and means for controlling the transmission of power to said gate.

20. In a vehicle, the combination of a load carrying compartment, a gate operatively supported on the discharge end of the vehicle and effective in one position to close said compartment completely against the discharge of material therefrom, and movable to another position to permit the discharge of material from said compartment, means deriving power from the travel of said vehicle for moving said gate to one position, and means for controlling the transmission of power to said gate.

21. A manure spreader comprising an end gate movable into and out of operative position, power operated means for actuating said end gate deriving its power from the movement of said spreader, means for starting the operation of said power operated means, and means for automatically interrupting the transmission of power to said end gate when said gate is moved to one of its positions.

22. In a manure spreader, the combination with a bed adapted to contain the material to be distributed, and means for moving such material therein, of an end gate comprising a flexible curtain adapted to be unwound to a lower position across the path of the material and to be wound to a raised position out of such path, power driven means for winding said curtain to raised position, and means for controlling the transmission of power to said curtain.

23. An end gate for manure spreaders comprising a curtain composed of transversely extending slats, links at the end portions of said slats connecting them together, and ratchet means operable to move the curtain substantially vertically out of engagement with the manure.

24. An end gate for manure spreaders comprising a curtain composed of transversely extending slats, links at the end portions of said slats connecting them together, ratchet means operable to move the curtain substantially vertically out of engagement with the manure, and hand actuated means for controlling the operation of said ratchet means.

25. The combination with a manure spreader having an end discharging type of bed, of a flexible curtain mounted to move into or out of position across the discharge end portion of the bed and capable of folding rearwardly within said bed, and ratchet means operable to raise or lower said curtain out of or into engagement with the manure.

26. In a manure spreader, the combination with a bed adapted to contain the material to be distributed, and means for moving such material therein, of a flexible curtain movable into position across the path of the material and capable of folding rearwardly within said bed to increase the capacity thereof, and a lever controlled ratchet mechanism operable to raise said curtain substantially vertically out of operative position.

27. In a manure spreader, the combination with a bed adapted to contain the material to be distributed, and means for moving such material therein, of a flexible curtain operatively supported at the rear of and above said bed and movable into position across the path of the material and to be guided between the sides of said bed, and ratchet mechanism operable to raise said curtain substantially vertically out of operative position.

LEONARD B. NEIGHBOUR.